United States Patent Office 2,895,989
Patented July 21, 1959

2,895,989

METHOD FOR THE PREPARATION OF IMINODIACETIC ACID

Arthur R. Sexton, Midland, Mich., assignor to The Dow Chemical Company, Midland, Mich., a corporation of Delaware No Drawing. Application June 22, 1956
Serial No. 593,052

12 Claims. (Cl. 260—534)

This invention relates to the preparation of iminodiacetic acid in a substantially pure form and has particular reference to a method for transforming the alkaline earth and alkali metal salts of iminodiacetic acid, including the ammonium salts thereof, into substantially pure, free iminodiacetic acid.

Much difficulty has been encountered in providing iminodiacetic acid in a suitably pure condition. This is generally due to the great tendency of the acid to enter into complexes with various alkaline earth, alkali metal and ammonium salts that may form and be present in the desired product during its preparation. It is also due to the purifying inefficiencies that are ordinarily involved when attempts are made to crystallize or otherwise isolate free iminodiacetic acid from compositions containing such by-product salts. Such conditions may be especially encountered when the free acid is being derived from its alkaline earth, alkali metal or ammonium salts which, for example, may be obtained upon the hydrolysis of iminodiacetonitrile.

It would be advantageous, and it is among the principal objectives of the present invention, to provide a method for transforming the alkaline earth and alkali metal salts of iminodiacetic acid, including the ammonium salts thereof, into substantially pure, free iminodiacetic acid. Other objects and advantages of the present invention will be manifest in the following description and specification.

According to the invention, the alkaline earth and alkali metal salts of iminodiacetic acid, including the ammonium salts thereof, may advantageously be transformed into free iminodiacetic acid in a substantially pure form by passing each equivalent weight of the salt of iminodiacetic acid in solution through contact with a fixed bed of an acidified form of a sulfonated vinyl aromatic ion exchange resin containing an amount of the resin that is commensurate in its ion exchanging capacity to the number of cation equivalent weights in the salt of the iminodiacetic acid that is being transformed, and subsequently separating a solution of the free iminodiacetic acid, in a substantially pure form, from the fixed bed of the ion exchange resin. It is usually preferable to contact the dissolved salt of iminodiacetic acid with the ion exchange resin by passing the solution of the former through the fixed bed of the latter maintained in a suitable packed tower. In order to obtain the desired result, it is usually best for the iminodiacetate salt solution to be free from other salts and it generally is necessary for it to be free from salts of non-volatile acids that are stronger than iminodiacetic acid. Beneficially, the spent ion exchange resin may be regenerated for reuse with a suitable acid after it has become exhausted from the transformation of equivalent quantities of the salt solution.

Advantageously, the solution of the salt of iminodiacetic acid that is being transformed is an aqueous solution that contains at least about 10 percent by weight of the dissolved salt. It is generally beneficial to conduct the ion exchanging transformation at a temperature between about 40 and 125° C. In many instances, however, it may be more desirable to perform the operation at a temperature that is in the range of from about 80 to 100° C.

It is preferable to employ the ion exchanging resin in an amount that is exactly commensurate in its ion exchanging capacity to the number of cation equivalents that are in the alkaline earth or alkali metal salts, including the ammonium salt, of iminodiacetic acid that is being transformed. Thus, for example, each equivalent weight of an alkaline earth salt of iminodiacetic acid having the formula: $NH(CH_2COO—)_2Z$, wherein Z is an alkaline earth metal ion, or for each equivalent weight of an alkali metal salt of iminodiacetic acid having the formula: $NH(CH_2COOM)_2$, wherein M is an alkali metal ion and which, as has been indicated, may also be an ammonium ion, may most advantageously be contacted with an amount of the ion exchanging resin that has a capacity for accepting exactly one cation equivalent weight. Suitable results, however, may sometimes be achieved when the amount of the ion exchanging resin that is employed for exchanging each cation equivalent weight in the salt of iminodiacetic acid that is being transformed is an amount that has the capacity to accept between about 0.95 and 1.05 equivalent weights of the cation as a consequence of ion exchange. Frequently, when a lesser quantity of the ion exchanging resin is employed, the desired product may be contaminated with the salts that are being transformed. If greater quantities of the resin are employed it may cause excessive qauntities of the desired free acid product to be withheld by the ion exchange resin so that inefficiencies and undesirable low yields are caused in the transformation of the iminodiacetate salt to acid. Since the ammonium salts of iminodiacetic acid are stable and cannot be converted to the free acid by simple decomposition, any quantity of free acid that is withheld by the ion exchange resin cannot be satisfactorily recovered by the technique of extraction with a basic ammonium solution.

The acid that may be employed for regenerating the ion exchange resin to its acidified form after it has become spent from transformation of the iminodiacetate salt to the free iminodiacetic acid is preferably a mineral acid that is adapted to provide a water-soluble salt with the exchanged cation. Thus, hydrochloric or sulfuric acid may be employed suitably for regenerating the resin when it has become spent with alkali metal ions while the latter acid would not be satisfactory for this purpose if alkaline earth metal ions were involved, due to the water-insoluble salts that would occur on the resin.

While the acidified form of various sulfonated vinyl aromatic ion exchanging resins may be employed suitably in the practice of the invention, it is particularly advantageous to utilize the acidified form of a sulfonated copolymer of styrene and divinyl benzene in order to transform the alkaline earth and alkali metal salts of iminodiacetic acid to the desired free acid product. The ion exchange resin of this variety that is available from The Dow Chemical Company under the trademark "Dowex 50-H" may be used with especial benefit. It is usually suitable to employ the resin when it is in the form of particles having an average size between about 20 and 50 mesh in the U.S. Sieve Series although, if desired, other particle sizes may be employed if allowance is made for the possible differences in their reactivity and ion exchanging capacity under the circumstances.

Solid free iminodiacetic acid may be recovered from solution by conventional evaporative techniques after it has been regenerated from its alkaline earth and alkali metal salts in accordance with the invention. The free acid product that may be obtained has a high degree of chemical purity. Frequently, for example, an iminodiacetic acid product having an absolute purity may be obtained.

By way of further illustration, an aqueous solution of the sodium salt of iminodiacetic acid was prepared by hydrolyzing about 760 grams (8 moles) of iminodiacetonitrile dissolved in about 3 liters of water with about 640 grams (16 moles) of sodium hydroxide dissolved in about 2.65 liters of water. The iminodiacetonitrile had been prepared from prussic acid, hydrocyanic acid and methyleneaminoacetonitrile according to the method of Bailey and Snyder as reported in the Journal of the American Chemical Society, 37, 935 (1915). The hydrolysis was accomplished over a three hour period in a five liter flask that was equipped with a glass stirrer and a thermometer and which was vented to the atmosphere. The aqueous nitrile solution was added via stillicidium over the entire reaction period to the sodium hydroxide solution in the flask while the reaction mass was maintained at a temperature between about 100 and 102° C. After all of the iminodiacetonitrile had been added, the reaction mass was synthermally maintained for an additional three hour period.

About 2900 grams of the thereby obtained reaction mass, an amount that had been calculated to contain about 13 moles of sodium ion in the sodium salt of iminodiacetic acid in aqueous solution, was then passed at a temperature of about 80° C. through a bed of "Dowex 50–H" ion exchange resin which was contained in a tower having an internal diameter of about 4 inches and a height of about 48 inches. About 5,200 grams of the resin were contained in the tower. This quantity of the resin had the capacity to accept exactly 13 moles of sodium ion in an ion exchanging reaction. After passing the reaction mass through the tower, the resin bed in the tower was washed with water at a temperature between about 80 and 90° C. until no further free iminodiacetic acid was detectable in the hot wash water effluent. The effluent from the tower, including the wash water, containing the regenerated iminodiacetic acid was then evaporated to dryness to obtain a solid residue that was dried to a constant weight at a temperature of 70° C. under an applied vacuum that was about 29 inches of mercury beneath atmospheric pressure. About 690 grams (6.3 moles) of fine, white free iminodiacetic acid crystals was thereby obtained, representing about a 96.5 percent yield from the iminodiacetonitrile that had been employed. The free iminodiacetic acid product that was obtained was determined, upon analysis, to have a purity of 100 percent.

It is to be fully understood that the present invention is to be construed and interpreted not by the foregoing didactic description and specification but in the light of what is set forth and defined in the appended claims.

What is claimed is:

1. Method for transforming the alkaline earth and alkali metal salts of iminodiacetic acid, including the ammonium salts thereof, into free iminodiacetic acid in a substantially pure form which comprises passing each equivalent weight of the salt of iminodiacetic acid in solution through contact with a fixed bed of an acidified form of a sulfonated vinyl aromatic ion exchange resin containing an amount of the resin that is commensurate in its ion exchanging capacity to the number of cation equivalent weights in the salt of the iminodiacetic acid that is being transformed, thereby to fix the cation of said salt in the bed of said ion exchange resin and to convert the salt to the free iminodiacetic acid; and recovering the resulting solution of the free iminodiacetic acid, in a substantially pure form, from the fixed bed of the ion exchange resin.

2. The method of claim 1, wherein the salt of iminodiacetic acid that is being transformed to free iminodiacetic acid is in an aqueous solution.

3. In the method of claim 1, contacting the salt of iminodiacetic acid with the ion exchange resin at a temperature between about 40 and 125° C.

4. In the method of claim 1, contacting the salt of iminodiacetic acid with the ion exchange resin at a temperature between about 80 and 100° C.

5. The method of claim 1, wherein the amount of the ion exchange resin that is employed for exchanging each cation equivalent weight in the salt of iminodiacetic acid that is being transformed is an amount that has the capacity for accepting between about 0.95 and 1.05 equivalent weights of the cation as a consequence of ion exchange.

6. The method of claim 1, wherein the amount of the ion exchange resin that is employed for exchanging each cation equivalent weight in the salt of iminodiacetic acid that is being transformed is an amount that has the capacity for exactly accepting one equivalent weight of the cation as a consequence of ion exchange.

7. The method of claim 1, wherein the ion exchange resin that is employed is the acidified form of a sulfonated copolymer of styrene and divinyl benzene.

8. The method of claim 1, wherein the ion exchange resin that is employed is the acidified form of a sulfonated copolymer of styrene and divinyl benzene having an average particle size between about 20 and 50 mesh in the U.S. Sieve Series.

9. A method in accordance with the method set forth in claim 1 wherein the fixed bed of the ion exchange resin is maintained in a tower.

10. The method of claim 1, and including the additional step of recovering solid, substantially pure, free iminodiacetic acid from the solution thereof after it has been separated from the ion exchange resin.

11. The method of claim 1 and including the additional step of regenerating the ion exchange resin for reuse after it has become spent from transformation to free iminodiacetic acid of equivalent quantities of the dissolved salt of iminodiacetic acid.

12. Transforming the sodium salt of iminodiacetic acid to free iminodiacetic acid in accordance with the method set forth in claim 1.

References Cited in the file of this patent

UNITED STATES PATENTS

| | | |
|---|---|---|
| 2,204,539 | Wassenegger | June 11, 1940 |
| 2,700,054 | White | Jan. 18, 1955 |

OTHER REFERENCES

Samuelson: Ion Exchangers in Analytical Chemistry, John Wiley and Sons, New York (1953), pages 14, 212 (Sci. Library).